United States Patent
Soma et al.

(10) Patent No.: US 11,405,330 B2
(45) Date of Patent: Aug. 2, 2022

(54) SYSTEM AND METHOD FOR BANDWIDTH OPTIMIZATION WITH SUPPORT FOR MULTIPLE LINKS

(71) Applicant: DELL PRODUCTS, LP, Round Rock, TX (US)

(72) Inventors: Dileep Kumar Soma, Austin, TX (US); Anantha K. Boyapalle, Cedar Park, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/078,749

(22) Filed: Oct. 23, 2020

(65) Prior Publication Data
US 2022/0131814 A1   Apr. 28, 2022

(51) Int. Cl.
| H04L 47/80 | (2022.01) |
| H04L 43/06 | (2022.01) |
| H04L 69/22 | (2022.01) |
| H04L 47/25 | (2022.01) |

(52) U.S. Cl.
CPC .......... H04L 47/805 (2013.01); H04L 43/06 (2013.01); H04L 47/25 (2013.01); H04L 69/22 (2013.01)

(58) Field of Classification Search
CPC ....... H04L 43/06; H04L 47/805; H04L 47/25; H04L 69/22

USPC ........................................................ 370/230
See application file for complete search history.

(56) References Cited

U.S. PATENT DOCUMENTS

| | | | |
|---|---|---|---|
| 6,356,565 B1* | 3/2002 | Bouyer | H04L 12/5602 370/236 |
| 6,690,678 B1* | 2/2004 | Basso | H04L 12/5602 370/395.1 |
| 7,016,302 B1* | 3/2006 | Schramm | H04L 12/5602 370/395.2 |
| 9,559,956 B2* | 1/2017 | Raghuraman | H04L 47/00 |
| 9,660,961 B2 | 5/2017 | Hanumantharayappa et al. | |
| 2005/0160171 A1* | 7/2005 | Rabie | H04L 47/822 709/227 |
| 2012/0230195 A1* | 9/2012 | Khivesara | H04L 47/828 370/235 |
| 2014/0331054 A1 | 11/2014 | Hanumantharayappa et al. | |
| 2015/0312891 A1 | 10/2015 | Quinn et al. | |
| 2016/0164787 A1* | 6/2016 | Roach | H04L 43/065 370/235 |
| 2019/0089766 A1* | 3/2019 | Corfield | H04L 47/30 |
| 2021/0173709 A1* | 6/2021 | Rusev | G06F 9/5005 |
| 2021/0243241 A1* | 8/2021 | Hardt | H04L 47/245 |

\* cited by examiner

*Primary Examiner* — James E Springer
(74) *Attorney, Agent, or Firm* — Larson Newman, LLP (57) ABSTRACT

A link management engine aggregates multiple links into a single link, and presents the single link to a bandwidth optimizer for a recommendation based on priorities assigned to applications. The engine may evaluate the recommendation for bandwidth optimization based on a current pipeline status, direct a packet to one of the multiple links based on the evaluation of the recommendation for bandwidth optimization, and generate a health report associated with the multiple links.

20 Claims, 5 Drawing Sheets

SYSTEM AND METHOD FOR BANDWIDTH OPTIMIZATION WITH SUPPORT FOR MULTIPLE LINKS

FIELD OF THE DISCLOSURE

The present disclosure generally relates to information handling systems, and more particularly relates to bandwidth optimization with support for multiple links.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A link management engine may aggregate multiple links into a single link, and present the single link to a bandwidth optimizer for a recommendation based on priorities assigned to applications. The engine may evaluate the recommendation for bandwidth optimization based on a current pipeline status, direct a packet to one of the multiple links based on the evaluation of the recommendation for bandwidth optimization, and generate a health report associated with the multiple links.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
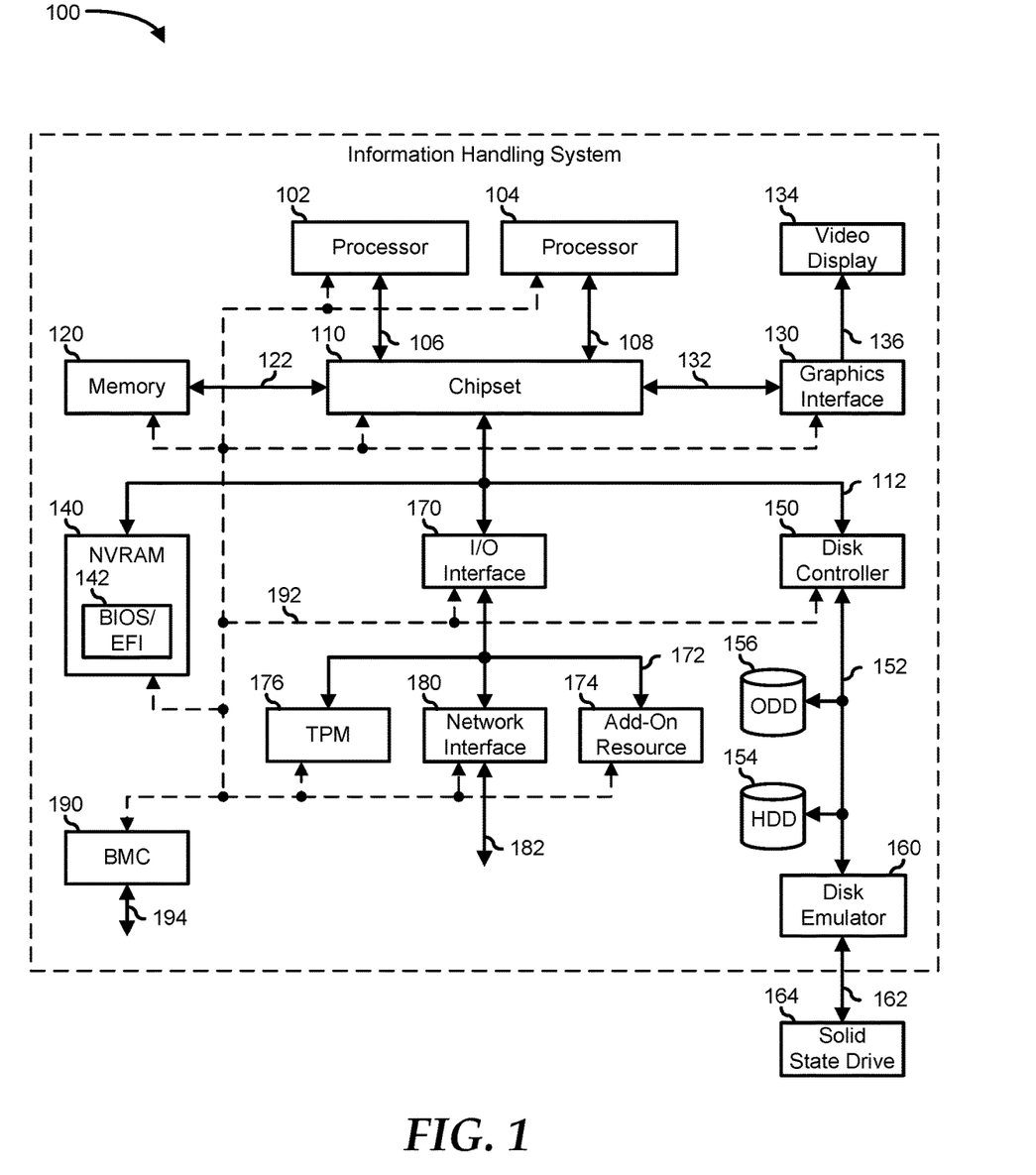
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a Hyper Transport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Bandwidth optimization in a data network is generally performed by prioritizing certain traffic over a single link even if multiple links are available. This is because a bandwidth optimization service generally has no knowledge of the multiple links and their properties, such as latencies and bandwidths, associated with each of the links. Therefore while there may be other links with higher bandwidth and/or lower latencies, those links may not be used. It is possible that because the traffic is transmitted over a single link, the traffic requirements may overwhelm the link or consume so much time that the quality of service (QoS) is affected. It would be an improvement to the QoS to be able to take advantage of the other available links. In this regard, the present disclosure allows the bandwidth optimization service to utilize the multiple links by assigning traffic to each one of the links simultaneously. The present disclosure may evaluate the traffic at the packet or connection level prior to performing the assigning traffic to a link. By utilizing all of the available links, the present disclosure improves the QoS and consequently the user experience.

Figure 2:
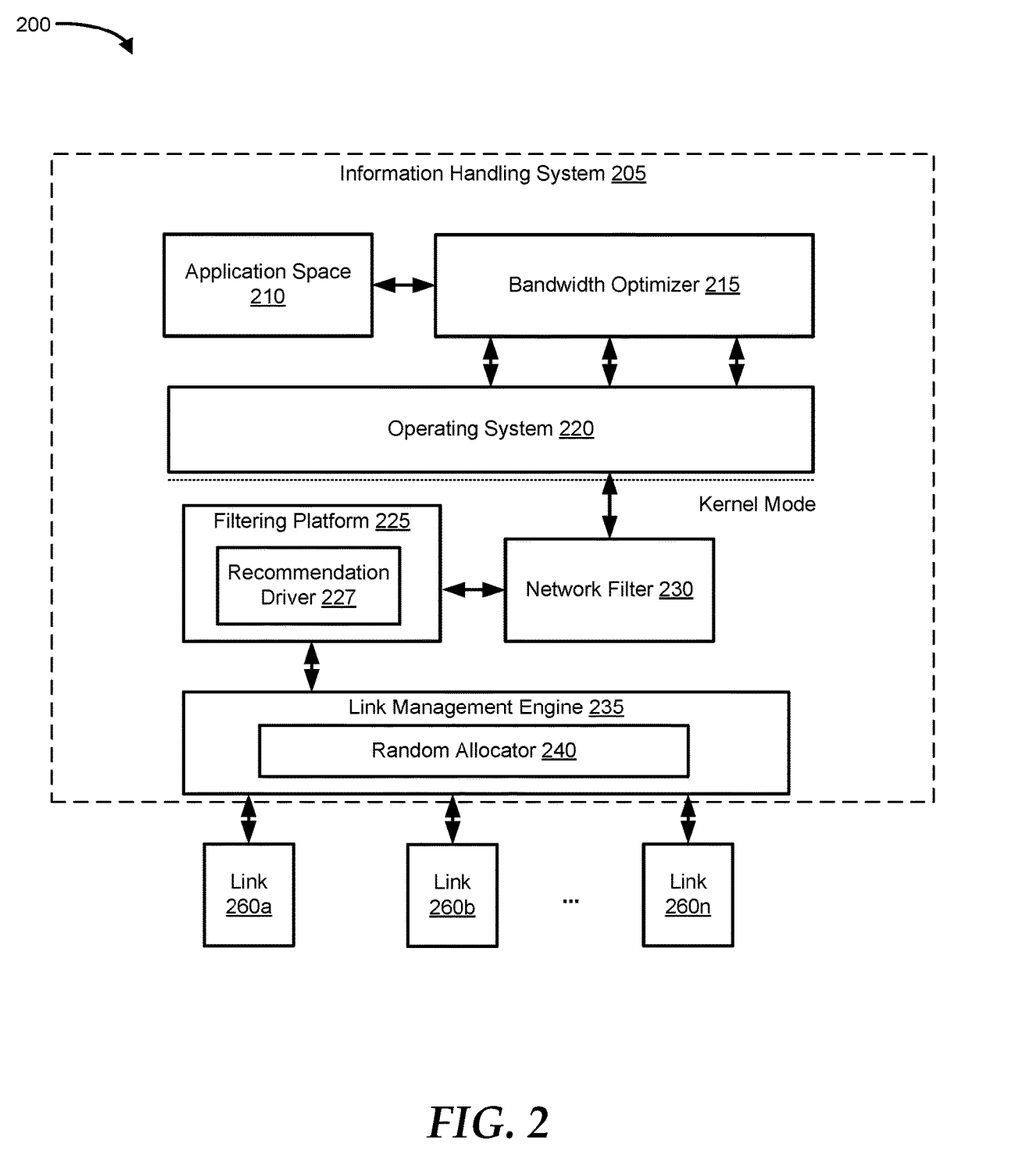
FIG. 2 is a block diagram illustrating an example of a system for bandwidth optimization with support for multiple links, according to an embodiment of the present disclosure.

FIG. 2 illustrates a system 200 for bandwidth optimization with support for multiple links. System 200 includes an information handling system 205, which is similar to information handling 100 of FIG. 1, and multiple links such as a link 260a, a link 260b to a link 260n. Information handling system 205 includes an application space 210, a bandwidth optimizer 215, an operating system 220, a filtering platform 225, a network filter 230, and a link management engine 235 which includes a random allocator 240. Filtering platform 225 includes a recommendation driver 227. Application space 210 includes one or more applications associated with data, voice, video, etc. For example, application space 210 may include a multimedia streaming application, a word processor, a spreadsheet, a video communications application, etc.

Bandwidth optimizer 215 may be configured as an application monitoring and bandwidth optimization service. Bandwidth optimizer 215 may be configured to observe traffic to and from application space 210 and assigns a priority to the traffic on per application, a per packet, or a per connection basis. Based on its observation, bandwidth optimizer 215 generates the recommendation to optimize the traffic flow. In one example, bandwidth optimizer 215 may assign weights based on the priorities or use a priority queueing mechanism. A threshold may also be used, wherein packets that do not meet the threshold may be recommended to be dropped. Bandwidth optimizer 215 may recommend one or more rules to optimize the bandwidth. For example, bandwidth optimizer 215 may recommend dropping a number of low priority packets and holding a number of normal priority packets to make way for the high priority packets. Because recommendation driver 227 is configured as a bridge between link management engine 235 and bandwidth optimizer 215, bandwidth optimizer 215 may transmit the recommendation to link management engine 235 via recommendation driver 227.

Link management engine 235, which operates at a network layer of the Open Systems Interconnection (OSI) model, is configured to facilitate an association between the network layer and the data link layer. Link management engine 235 may be configured to retrieve information from filtering platform 225 which is an operating system filtering platform such as Windows® filtering platform (WFP). Filtering platform 225 includes a set of application programming interfaces and services such as recommendation driver 227 that allows link management engine 235 to tie into packet processing and filtering pipeline of network filter 230 and application monitoring and bandwidth optimization service of bandwidth optimizer 215. Network filter 230 may be a differentiated services code point (DSCP) network filter that manages QoS on internet protocol (IP) networks. Network filter 230 may allow link management engine 235 to manage bandwidth optimization of the links on a per-packet and/or per connection-level or basis based on a recommendation from bandwidth optimizer 215. Filtering platform 225 allows link management engine 235 to manage bandwidth optimization of the links on a per application basis.

Link management engine 235 may be configured to aggregate multiple links, also referred to as link aggregation, such as link 260a, link 260b through link 260n which is then presented as an aggregated or single link to various services such as bandwidth optimizer 215. Link 260a, link 260b through 260n, which is similar to network channel 182 of FIG. 1, are communication channels for data transmission, which includes uplinks and downlinks, between information handling system 205 and other clients and/or servers in the network. The aforementioned links may include a wired link, wireless link, cellular link, etc. For example, the links may include an Ethernet link, a fifth generation (5G) cellular link, a Wi-Fi channel, etc.

For the uplinks and the downlinks, random allocator 240 may be configured to send packets randomly through one of link 260a, link 260b, and link 260n. For acknowledgments, random allocator 240 follows the same route from which the packet was transmitted. However, if packet-level precision is enabled in link management engine 235, such as by using the multi-link virtual private network (ML-VPN) in link management engine 235, then the acknowledgments may also be transmitted randomly through one of the links. ML-VPN is a technology that allows link management engine 235 to manage bandwidth optimization across multiple links at packet level granularity.

Link management engine 235 may be configured to perform a packet-by-packet analysis of the network traffic in kernel mode and decode the packet's raw data showing values of various fields in the packet. Link management engine 235 may parse the packet to determine the priority of the packet assigned by bandwidth optimizer 215 in addition to determining other information such as data from a packet header which includes a source address, destination address, length, payload, etc. Link management engine 235 may execute the recommendation received from bandwidth optimizer 215 via recommendation driver 227. For example, based on the recommendation above, link management engine 235 may stop transmission of the recommended number of low priority packets mimicking an error in the pipeline and reducing the bandwidth of the application associated with the low priority packets. Because the bandwidth of the application associated with the low priority packets is reduced, the high priority packets may be allocated additional bandwidth equivalent to the amount of the reduced bandwidth. Thus, allowing the higher priority packets faster transmission. In another embodiment, link management engine 235 may change the priority at the packet level, such as from high priority to normal priority or from normal priority to high priority to optimize the bandwidth.

Link management engine 235 may also be configured to change the priority of the packet and send it to random allocator 240 to be transmitted to a link. The change in the priority may be based on a recommendation from bandwidth optimizer 215. Random allocator 240 may be configured to transmit the network traffic to a random link of the available links. Random allocator 240 may be configured to utilize each one of the available links simultaneously increasing efficiency and QoS.

Figure 3:
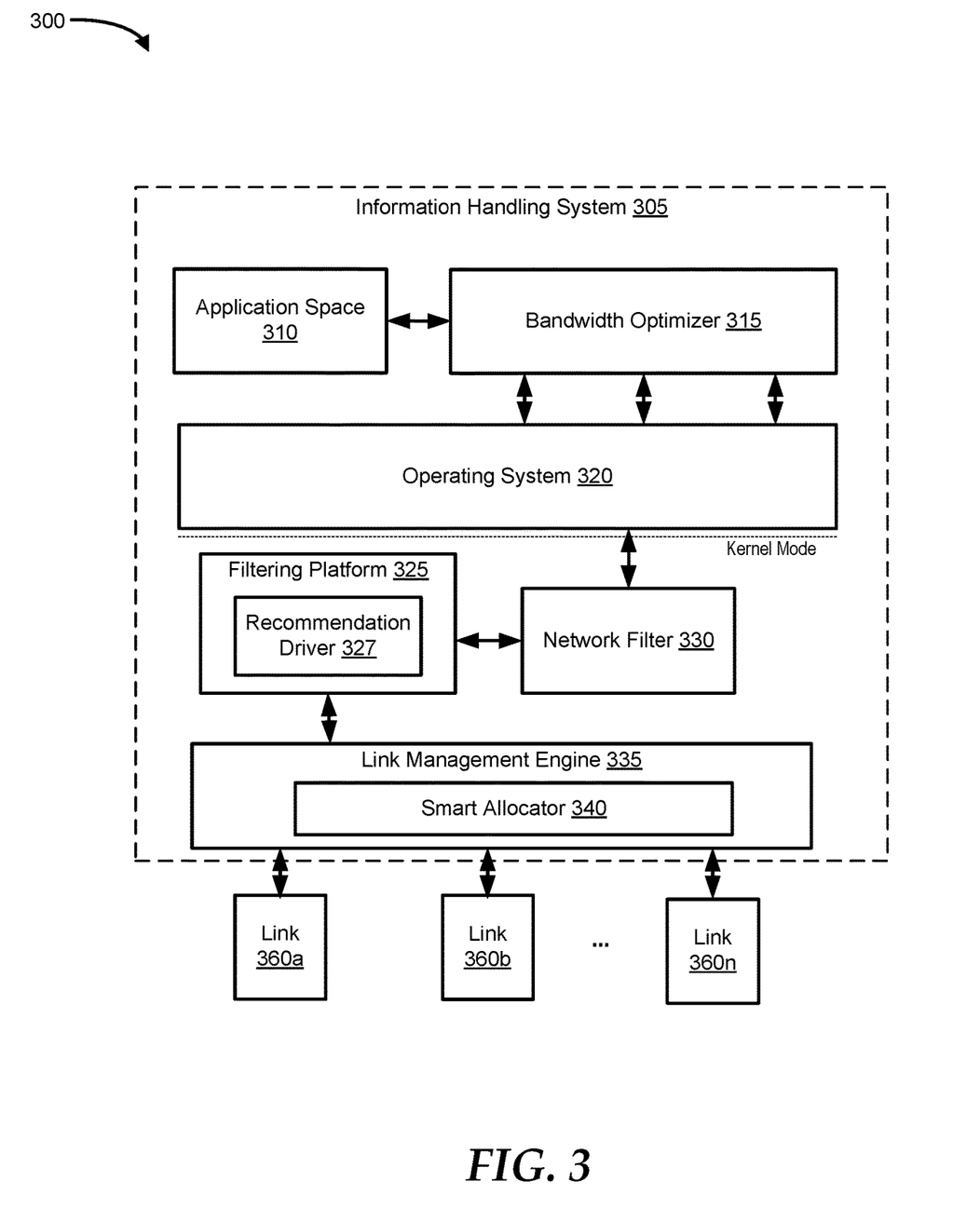
FIG. 3 is a block diagram illustrating an example of a system for bandwidth optimization with support for multiple links, according to an embodiment of the present disclosure.

FIG. 3 illustrates a system 300 for bandwidth optimization with support for multiple links. System 300 includes an information handling system 305, which is similar to information handling 100 of FIG. 1, and multiple links such as a link 360a, link 360b to link 360n. Information handling system 305 includes an application space 310, a bandwidth optimizer 315, an operating system 320, a filtering platform 325, a network filter 330, and a link management engine 335 which includes a smart allocator 340. Filtering platform 325 includes a recommendation driver 327.

Bandwidth optimizer 315, which is similar to bandwidth optimizer 215 of FIG. 2, may be configured as an application monitoring and bandwidth optimization service. Bandwidth optimizer 215 may be configured to observe traffic to and from application space 310 and assign a priority to the traffic on per application, a per packet, or a per connection basis. Based on its observation, bandwidth optimizer 315 generates the recommendation to optimize the traffic flow which includes assigning a priority to the network traffic on a per application, a per packet, or a per connection basis of network traffic associated with applications in application space 310. Because recommendation driver 327 may be configured as a bridge between link management engine 335 and bandwidth optimizer 315, bandwidth optimizer 315 may transmit the recommendation to link management engine 335 via recommendation driver 327.

Link management engine 335, which is similar to link management engine 235 of FIG. 2, may be configured to retrieve information from filtering platform 325, which is similar to filtering platform 225 of FIG. 2. Filtering platform 325 may include application programming interfaces and services such as such as recommendation driver 327. Further, filtering platform 325 may be configured to allow an application in application space 310 to tie in with packet processing and filtering pipeline of network filter 330, which is similar to network filter 230 of FIG. 2. Network filter 330 manages network traffic on information handling system 305. Network filter 330 allows link management engine 335 to manage bandwidth optimization of multiple links on a per-packet and/or per-connection basis while filtering platform 325 allows link management engine 335 to manage bandwidth optimization of multiple links on a per-application basis. Link management engine 335 may be configured to aggregate multiple links such as link 360a, link 360b through link 360n which is then presented as a single link also referred as an aggregated link to bandwidth optimizer 215. Link 360a, link 360b through 360n are similar to link 260a, link 260b through link 260n of FIG. 2.

Link management engine 335 may be configured to determine whether to execute the recommendation from bandwidth optimizer 315 on a per packet or per connection level. Link management engine 335 may be configured to perform a packet-by-packet analysis of the network traffic in kernel mode to determine the priority of the packet and/or other information associated with the packet. Link management engine 335 may change the priority of the packet and send it to smart allocator 340 to be transmitted to a link.

Smart allocator 340 may be configured to, monitor, manage, and control the utilization of the links. In particular, smart allocator 340 may be configured to utilize each one of the various links based on the properties of each of the links such as bandwidth and speed and the recommendation of bandwidth optimizer 315 increasing the efficiency of network traffic transmission. Smart allocator 340 may determine whether or not to execute the recommendation based on the current pipeline status and/or link status.

In one instance, smart allocator 340 may determine to execute the recommendation of bandwidth optimizer 315. However, smart allocator 340 may determine that executing the recommendation such as to reduce the bandwidth of certain applications may not increase the bandwidth of the high priority applications. In this instance, smart allocator 340 may provide bandwidth optimizer 315 with information that identifies one or more connections operating on a particular link. Smart allocator 340 may also provide bandwidth optimizer 315 with information that identifies which link has traffic that includes high priority applications and low or normal priority applications. Based on the aforementioned information, bandwidth optimizer 315 may update the recommendation. For example, bandwidth optimizer 315 may recommend reducing bandwidth of low priority applications instead of the prior recommendation to reduce bandwidth of high priority applications.

In managing the links, smart allocator 340 may utilize each of the links simultaneously. For uplinks and downlinks, smart allocator 340 may be configured to send network packets through one of link 360a, link 360b to link 360n based on a recommendation from bandwidth optimizer 315 and evaluation of the network traffic. For acknowledgments, random allocator 340 may follow the same route from which the network packet was transmitted. However, if packet-level precision is enabled in link management engine 335, then the acknowledgments may also be transmitted randomly through one of the links. Enabling the packet level precision allows link management engine 335 to manage bandwidth optimization across multiple links at packet level granularity.

Smart allocation 340 may be configured to use different algorithms for effective bandwidth utilization of each of the multiple links. For example, smart allocator 340 may send a high priority application over a link with the most bandwidth or least latency. Smart allocator 340 may also determine whether the link is reaching a congestion threshold and perform one or more countermeasures. For example, smart allocator 340 may employ bandwidth throttling of the one or more links to regulate network traffic and minimize bandwidth congestion. Smart allocator 340 may also send the next application to the next available link with the highest bandwidth. In another example, smart allocator 340 may free up bandwidth on one of the links to allow another high priority application to go through. In yet another example, smart allocator 340 may lower or raise the priority of packets associated with an application based on the available bandwidth and the priority of other applications.

Smart allocator 340 may be configured to monitor the health status of the links and/or the pipeline subsequent to executing the recommendation. Smart allocator 340 may also be configured to generate a health report based on the health status and transmit the health report to bandwidth optimizer 315. The health report may determine various properties of each of the links such as its availability, congestion, latency, etc. The health report may determine how many high priority applications and/or high priority packets are currently being processed in addition to the normal priority application and/or normal priority packets being processed. The health report may also include information on how many low priority applications and/or packets are currently being processed. In addition, the health report may correlate the aforementioned information with information associated with the current pipeline and/or link status such as available links, speed, and/or bandwidth. Smart allocator 340 may then provide a recommendation to bandwidth optimizer 315 based on the health report. By doing performing the above, smart allocator 340 enables adaptive scaling of bandwidth optimization over multiple links.

Smart allocator 340 may be configured to use the links associated with information handling system 305, such as link 360a, link 360b through link 360n. In addition, smart allocator 340 is configured to maintain constant the percentage of packet drop of an application when the packet level precision is enabled, such as when ML-VPN is enabled. If the packet level precision is not enabled, then smart allocator 340 is configured to maintain the connection drop constant. If bandwidth optimizer 315 tries to reduce the bandwidth of an application, then smart allocator 340 may determine whether to enforce the recommendation or not enforce the recommendation based on the current state of the pipeline and/or the link 360a, link 360b through link 360n. For example, smart allocator 340 may allocate the network traffic to one or more links based on the speed or available bandwidth of the link.

Figure 4:
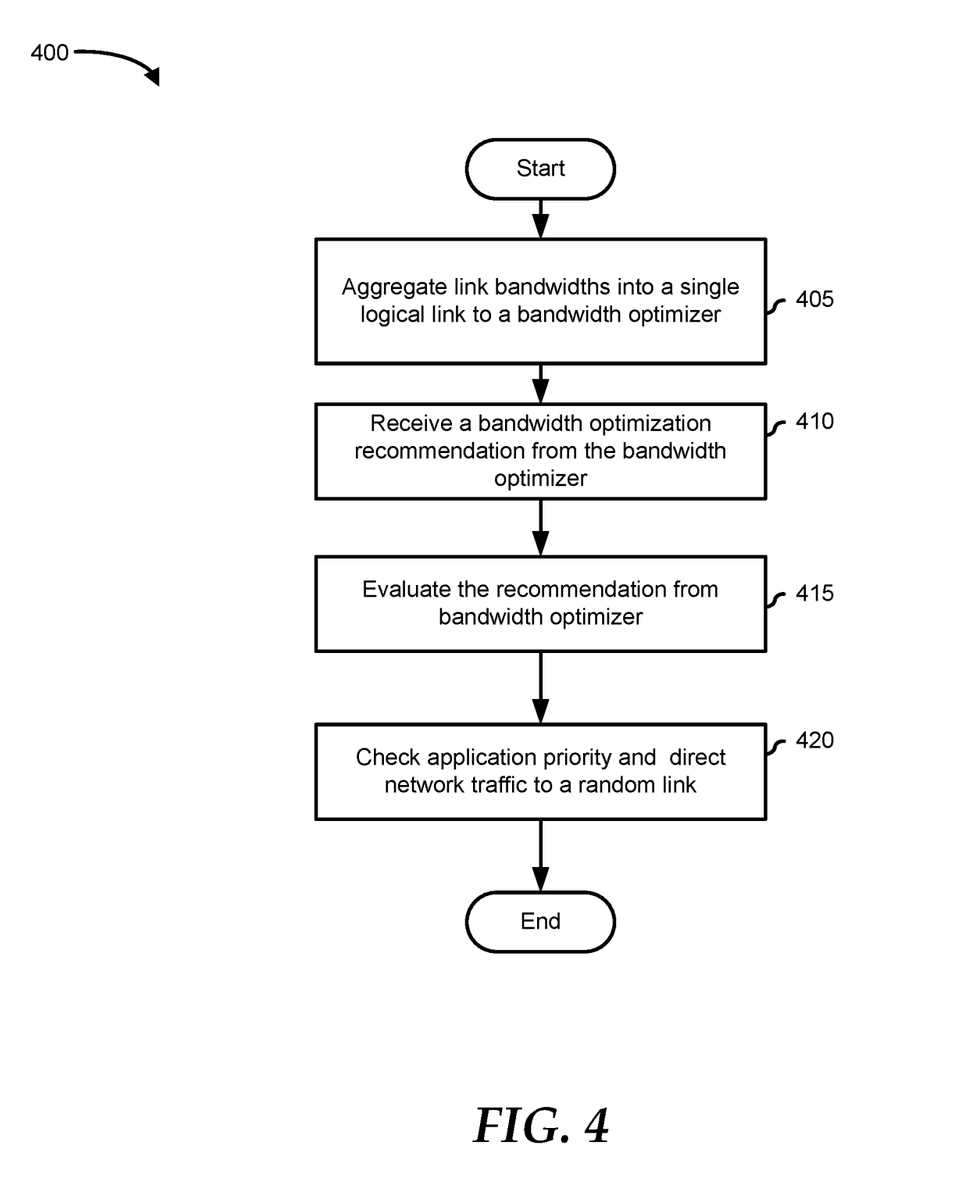
FIG. 4 is a flowchart illustrating an example of a method for bandwidth optimization with support for multiple links, according to an embodiment of the present disclosure.

FIG. 4 illustrates a method 400 for bandwidth optimization with support for multiple links. While embodiments of the present disclosure are described in terms of system 200 of FIG. 2, it should be recognized that other systems may be utilized to perform the described method. In particular, method 400 may be performed by link management engine 235 and/or random allocator 240 of FIG. 2.

FIG. 4 typically starts at block 405 where the method aggregates the capacities of the multiple links of an information handling system and presents itself as a single link to services of the information handling system such as a bandwidth optimizer. The method proceeds to block 410 where the method receives a recommendation to regulate the network traffic from the bandwidth optimizer. The method proceeds to block 415, where the method evaluates the recommendation received from the bandwidth optimizer. In addition, the method checks the status of the pipelines. For example, the method determines whether there is an error in the pipeline, or if the pipeline is clear for transmission.

The method may proceed to block 420 where the method determines the priorities of each one of the packets in the traffic. The method may also determine the priority on a connection level. Subsequent to determining the priorities, the method directs one or more packets to a random link. The method may also direct the one or more packets based on the recommendation from the bandwidth optimizer. After directing the packet to the random link, the method may direct another packet to another random link. The method may also throttle the other links to regulate the traffic of the applications with lower priority. After sending the traffic to the link, the method ends.

Figure 5:
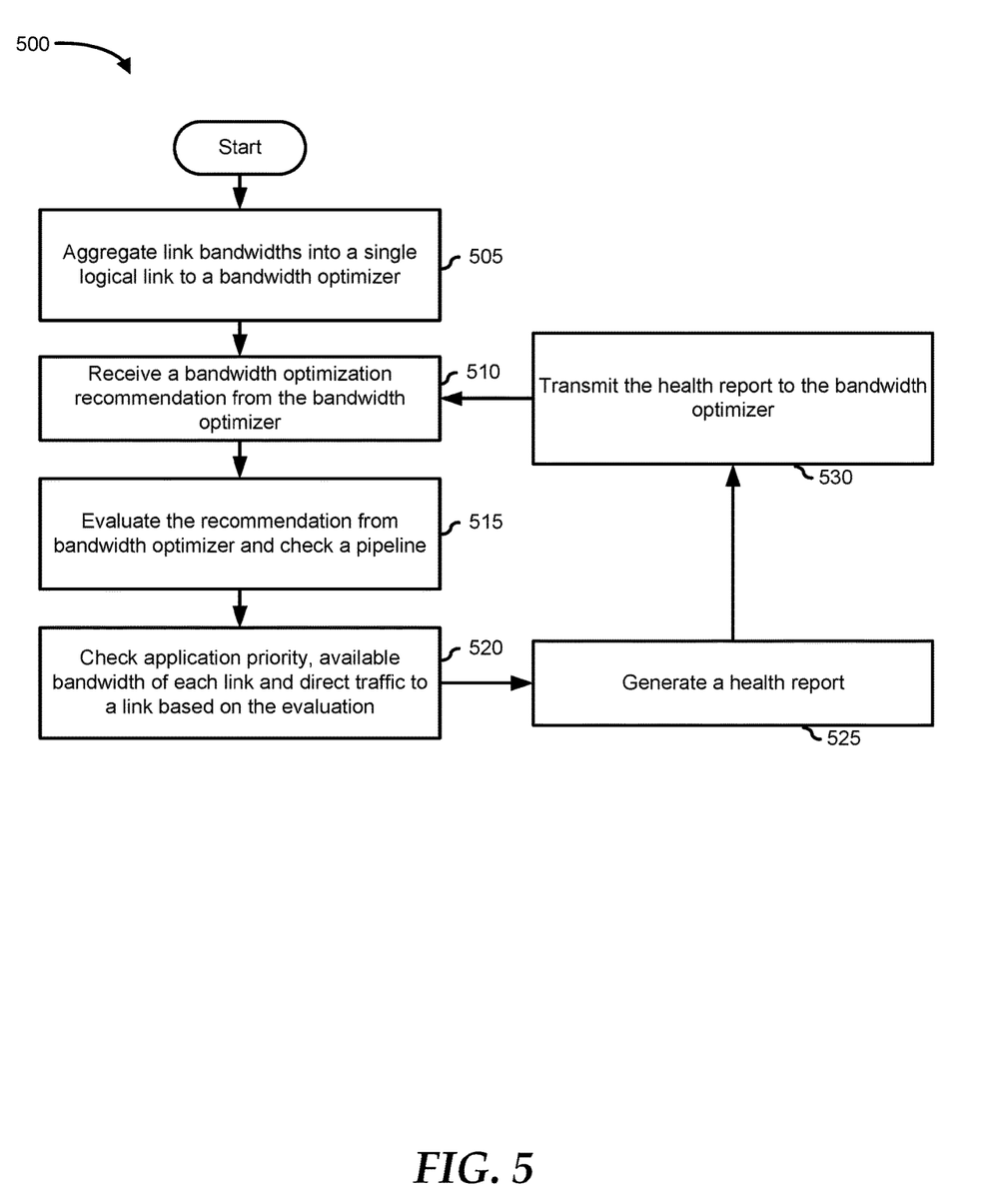
FIG. 5 is a flowchart illustrating an example of a method for bandwidth optimization with support for multiple links, according to an embodiment of the present disclosure.

FIG. 5 illustrates a method 500 for bandwidth optimization with support for multiple links. While embodiments of the present disclosure are described in terms of system 300 of FIG. 3, it should be recognized that other systems may be utilized to perform the described method. In particular, method 500 may be performed by a link management engine and/or smart allocator similar to link management engine 335 and/or smart allocator 340 of FIG. 3.

FIG. 5 typically starts at block 505 where the method aggregates the bandwidth of multiple links associated with an information handling system. The aggregated links are presented as a single link to various services such as a bandwidth optimizer. The method proceeds to block 510 where the method receives a bandwidth optimization recommendation from the bandwidth optimizer. The method then proceeds to block 515, where the method evaluates the received recommendation. In addition, the method checks the connections in the pipeline to determine its status based on various factors such as bandwidth availability, congestion, latency, error, etc. The method may evaluate the received recommendation based on the current pipeline status.

The method proceeds to block 520 where the method checks the priority of the one or more application in the traffic. The method may analyze each packet to determine the priority and other information associated with the traffic. The method may also determine the available bandwidth and direct the traffic to each one of the links based on the determination on a per packet level. The method may use various mechanisms to perform the above. For example, the method may maintain a queue for each priority class, such as a queue for high priority applications, another queue for normal priority applications, and a third queue for low priority applications. The method may transmit from the queue with high priority applications first prior to transmitting from the queue with normal priority applications. The method may empty the queue with high priority applications before transmitting from the queue with the normal priority applications. In another embodiment, instead of emptying the queue with high priority applications, the method may set a threshold and start transmitting from the queue with the normal priority applications once the threshold is reached. The method may start throttling the links if the queue for the low priority applications is full or has reached a threshold.

At block 525, the method generates a health report associated with the one or more links and/or the current pipeline status. The health report may include information such as bandwidth availability, network congestion, latency, priorities of the applications currently in the pipeline, ratio, or percentage of high priority applications over the other applications currently in the pipeline, percentage of errors if any, etc. Based on the health report, the method may generate a throttling recommendation as well. For example, the method may provide a ranking of the links for throttling wherein a link with the highest reduction in bandwidth may be ranked and/or throttled first.

The method proceeds to block 530, where the method may transmit the health report to the bandwidth optimizer where the bandwidth optimizer may utilize the health report in generating the next bandwidth optimization recommendation. In addition, the method may also transmit one or more recommendations such as the throttling recommendation to the bandwidth optimizer for analysis.

Although FIG. 4, and FIG. 5 show example blocks of method 400 and method 500 in some implementation, method 400 and method 500 may include additional blocks, fewer blocks, different blocks, or differently arranged blocks than those depicted in FIG. 4 and FIG. 5. Additionally, or alternatively, two or more of the blocks of method 400 and method 500 may be performed in parallel. For example, block 515 and block 520 of method 500 may be performed in parallel.

As used herein, a "packet" refers to a group of bits that can be transported across a network. The term packet shall not be interpreted as limiting embodiments of the present invention to Layer 3 networks. In addition, the term packet along with similar terms "data traffic", "network traffic", "traffic", etc. may be replaced by other terminologies referring to a group of bits such as "datagram" or "cell", and may be used interchangeably.

Link aggregation refers to various methods of allowing links be used as if they were a single link. A link is a wired or wireless communications connection between two nodes such as point-to-point link or a network link like an Internet link. The link may use a protocol responsible for transmitting data between two points.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
aggregating, by a processor, multiple links into a single link;
presenting the single link to a bandwidth optimizer;
receiving a recommendation for bandwidth optimization of the single link from the bandwidth optimizer, wherein the recommendation for the bandwidth optimization is based on priorities assigned to applications;
evaluating the recommendation for the bandwidth optimization based on a current pipeline status;
directing traffic to one of the multiple links based on the evaluating performed on the current pipeline status;
generating a health report associated with the multiple links;
generating a throttling recommendation based on the health report; and
transmitting the health report and the throttling recommendation to the bandwidth optimizer.

2. The method of claim 1, wherein the health report is further based on the current pipeline status.

3. The method of claim 1, further comprising evaluating the traffic on a per packet level.

4. The method of claim 3, further comprising the evaluating the traffic on the per packet level includes determining priorities of each one of a plurality of packets.

5. The method of claim 3, further comprising executing the recommendation for the bandwidth optimization.

6. The method of claim 5, further comprising subsequent to the executing the recommendation, monitoring health status of each one of the links.

7. The method of claim 1, wherein the throttling recommendation includes a ranking of the multiple links for throttling.

8. The method of claim 1, further comprising parsing a packet to determine an assigned priority of the packet.

9. The method of claim 1, further comprising directing another packet to another one of the multiple links.

10. An information handling system, comprising:
a bandwidth optimizer;
a link management engine configured to:
aggregate multiple links into a single link;
present the single link to the bandwidth optimizer for a recommendation for bandwidth optimization;
receive the recommendation for the bandwidth optimization of the single link from the bandwidth optimizer, wherein the recommendation for the bandwidth optimization is based on priorities assigned to applications;
evaluate the recommendation for the bandwidth optimization based on a current pipeline status;
direct a packet to one of the multiple links based on the evaluation of the recommendation for the bandwidth optimization;
generate a health report associated with the multiple links, the health report correlating information associated with packets being processed to the current pipeline status;
generate a throttling recommendation; and
transmit the throttling recommendation with the health report to the bandwidth optimizer.

11. The information handling system of claim 10, wherein the link management engine is further configured to direct another packet to another one of the multiple links.

12. The information handling system of claim 10, wherein the link management engine is further configured to parse the packet to determine a specified priority of the packet.

13. The information handling system of claim 10, wherein the throttling recommendation is based on the health report.

14. The information handling system of claim 10, wherein the link management engine is further configured to determine high priority packets.

15. A method comprising:
aggregating, by a processor, multiple links into a single link;
receiving a recommendation for bandwidth optimization of the single link from a bandwidth optimizer, wherein the recommendation for the bandwidth optimization is based on an assigned priority;
executing the recommendation for the bandwidth optimization based on the assigned priority, wherein a queue for each priority class is maintained;
transmitting from a first queue with high priority applications prior to transmitting from a second queue with normal priority applications;
subsequent to the executing the recommendation, directing a packet to a random link;
generating a health report associated with the multiple links;
generating a throttling recommendation based on the health report; and
transmitting the health report and the throttling recommendation to the bandwidth optimizer.

16. The method of claim 15, further comprising parsing the packet to determine the assigned priority of the packet.

17. The method of claim 16, further comprising subsequent to the parsing the packet, changing the assigned priority of the packet.

18. The method of claim 15, further comprising directing another packet to another random link.

19. The method of claim 15, further comprising throttling one of the multiple links based on the recommendation.

20. The method of claim 15, further comprising stopping transmission of another packet based on the recommendation.

* * * * *